United States Patent
Ishikawa et al.

(10) Patent No.: US 7,076,098 B2
(45) Date of Patent: Jul. 11, 2006

(54) ADAPTIVE IMAGE PROCESSING UNIT FOR EXTRACTING CHARACTERISTIC PORTION FROM IMAGE

(75) Inventors: Takahiro Ishikawa, Anjo (JP); Takeshi Kawashima, Seto (JP)

(73) Assignee: Denso Corporation, Kariya (JP)

( * ) Notice: Subject to any disclaimer, the term of this patent is extended or adjusted under 35 U.S.C. 154(b) by 1033 days.

(21) Appl. No.: 10/084,234

(22) Filed: Feb. 28, 2002

(65) Prior Publication Data
US 2002/0122592 A1 Sep. 5, 2002

(30) Foreign Application Priority Data
Mar. 2, 2001 (JP) ............................. 2001-058497

(51) Int. Cl.
*G06K 9/46* (2006.01)
(52) U.S. Cl. ..................................... 382/190
(58) Field of Classification Search ................ 382/115, 382/118, 209, 154, 190, 192, 194; 345/441
See application file for complete search history.

(56) References Cited

U.S. PATENT DOCUMENTS 5,774,129 A    6/1998  Poggio et al.
6,148,099 A *  11/2000 Lee et al. .................... 382/149
6,611,613 B1 * 8/2003  Kang et al. .................. 382/118

FOREIGN PATENT DOCUMENTS

| JP | A-2-215276 | 8/1990 |
| JP | A-6-233761 | 8/1994 |
| JP | A-7-160881 | 6/1995 |
| JP | A-2000-22929 | 1/2000 |
| JP | A-2000-194859 | 7/2000 |

* cited by examiner

*Primary Examiner*—Vikkram Bali
(74) *Attorney, Agent, or Firm*—Posz Law Group, PLC (57) ABSTRACT

An image area extract unit includes a modeling unit for generating a pixel evaluation model used for extraction, and an extract unit for extracting a characteristic portion from an original image using the pixel evaluation model. The modeling unit sequentially generates a plurality of partial polynomials according to a modified Group Method of Data Handling using a training image taken under the same condition under which the original image is taken and a supervisory image that designates the characteristic portion of the training image. Each of the generated partial polynomials is outputted to the extract unit in the form of its coefficients only when a square error satisfies a predetermined criterion. The extract unit calculates the feature values for each pixel of the original image using the pixel evaluation model, and defines the extractive area that includes the characteristic portion based on the feature values.

20 Claims, 10 Drawing Sheets

FIG. 2A

ORIGINAL IMAGE

FIG. 2B

MASKED

EXTRACTED IMAGE

FIG. 3A

PIXEL VALUES "255"

PIXEL VALUES "0"

SUPERVISORY IMAGE

FIG. 3B

TRAINING IMAGE

FIG. 7A
MODIFIED GMDH

FIG. 7B
GMDH

MODIFIED GMDH

FIG. 8B

GMDH

FIG. 9

| SQUARE ERROR (×10⁹) | GMDH | | | MODIFIED GMDH | | |
|---|---|---|---|---|---|---|
| | P. POLYNOMIALS | ADDITIONS | MULTIPLICATIONS | P. POLYNOMIALS | ADDITIONS | MULTIPLICATIONS |
| 0.77 | 7.6 | 60.8N | 38.0N | 2.0 | 30.0N | 18.0N |
| 0.76 | 8.4 | 67.2N | 42.0N | 3.2 | 48.0N | 28.8N |
| 0.75 | 10.2 | 81.6N | 51.0N | 5.2 | 78.0N | 46.8N |
| 0.74 | 13.4 | 107.2N | 67.0N | 6.4 | 96.0N | 57.6N |
| 0.73 | 15.0 | 120.0N | 75.0N | 8.2 | 123.0N | 73.8N |

ADAPTIVE IMAGE PROCESSING UNIT FOR EXTRACTING CHARACTERISTIC PORTION FROM IMAGE

CROSS REFERENCE TO RELATED APPLICATION

The present application is based on and incorporates herein by reference Japanese Patent Application No. 2001-58497 filed on Mar. 2, 2001.

BACKGROUND OF THE INVENTION

1. Field of the Invention

The present invention relates to an image recognition technique, more particularly to an image area extract unit for extracting a characteristic portion from an image.

2. Related Art

It is proposed that a characteristic portion is extracted from an image of a vehicle, a traffic sign, an advertising display, a person or the like utilizing image recognition. JP-A-2000-22929 proposes a technique for extracting the face area from an image of a person in a person image processing unit. This technique extracts the face area by determining whether the RGB values of each pixel satisfy predetermined fixed criteria for flesh color.

However, the color of the face area in the image (i.e., the RGB values of pixels belonging to the face area) may vary depending on a condition under which the image is taken. Therefore it is difficult to set the fixed criteria for flesh color appropriately. That is, it is every possibility that the technique cannot extract the face area properly depending on a condition under which the image is taken.

Accordingly, in order to extract the face area properly, the criteria for flesh color should be adjusted according to a condition under which the image is taken. However, it is practically impossible to set different criteria for all possible conditions.

SUMMARY OF THE INVENTION

The present invention has an object to provide an image area extract unit capable of adaptively changing a model used for extraction according to a condition under which an image is taken so that a characteristic portion of the image is properly extracted.

An image area extract unit according to the present invention includes original image acquisition means, training image acquisition means, supervisory image acquisition means, model generation means, and area definition means. The original image acquisition means acquires an original image from which a characteristic portion should be extracted. The training image acquisition means acquires a training image taken under the same condition under which the original image is taken. The supervisory image acquisition means acquires a supervisory image that designates a characteristic portion of the training image. The characteristic portion of the training image corresponds to the characteristic portion of the original image. Each pixel of the supervisory image provides a supervisory output.

The model generation means generates a pixel evaluation model based on the relationship between the values of the pixels of the training image and the supervisory outputs provided by the pixels of the supervisory image. The pixel evaluation model receives the value of one of the pixels of the original image as an input, and outputs a feature value of the pixel. The area definition means calculates the feature value of each pixel of the original image using the pixel evaluation model, and defines an extractive area of the original image based on the feature value of each pixel of the original image. The extractive area includes the characteristic portion of the original image.

Preferably, the model generation means sequentially generates a plurality of partial polynomials according to a Group Method of Data Handling. Thus an estimation model that includes at least one of the plurality of partial polynomials is generated as the pixel evaluation model.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
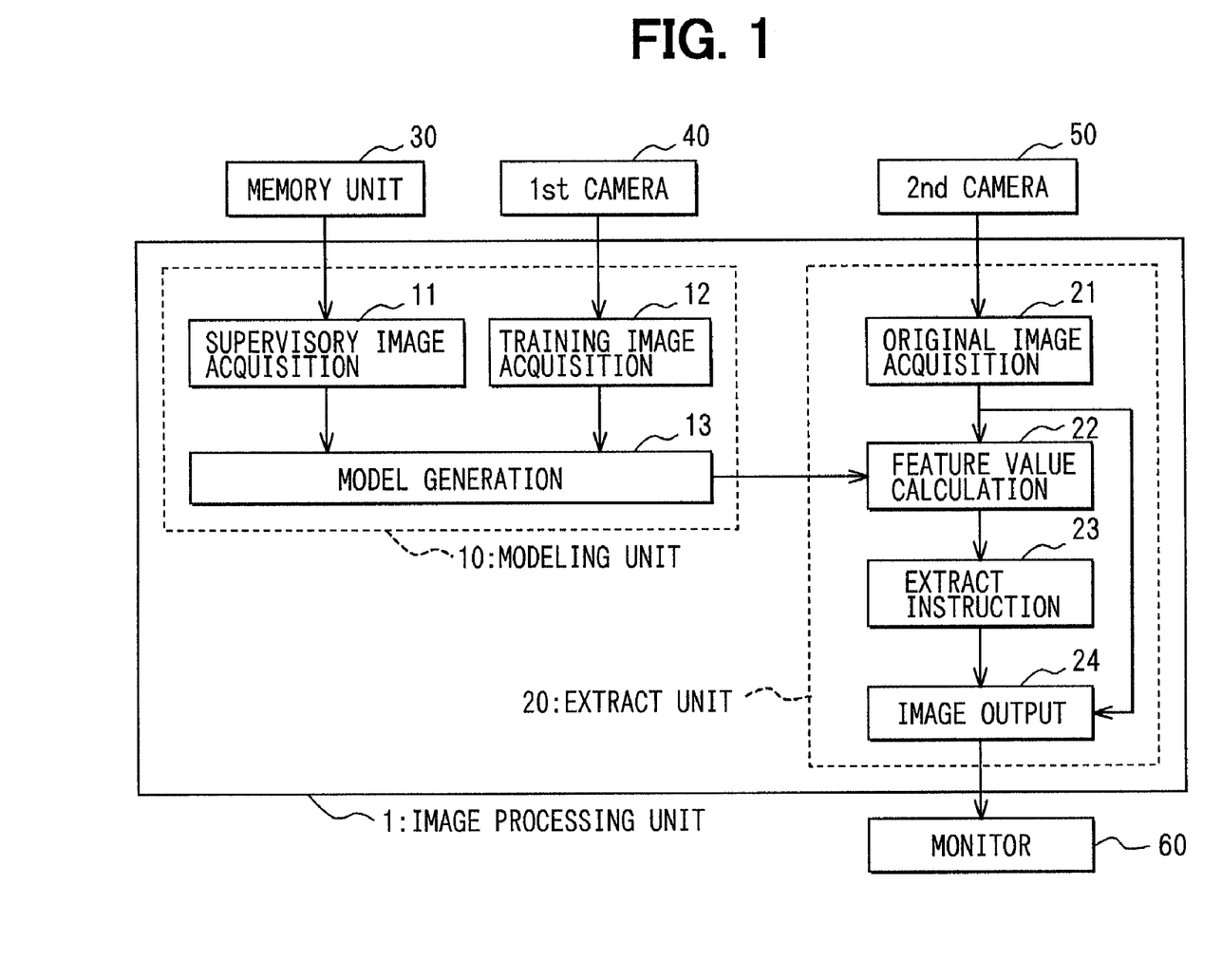
FIG. 1 is a functional block diagram showing an image processing unit according to an embodiment of the present invention.

Referring to FIG. 1, an image processing unit 1 according to an embodiment of the present invention includes a modeling unit 10 and an extract unit 20. The modeling unit 10 includes a supervisory image acquisition block 11, a training image acquisition block 12 and a model generation block 13. The extract unit 20 includes an original image acquisition block 21, a feature value calculation block 22, an extract instruction block 23 and an image output block 24. A memory unit 30, first and second digital video cameras 40, 50 and a monitor 60 are connected to the image processing unit 1.

Figure 2A:
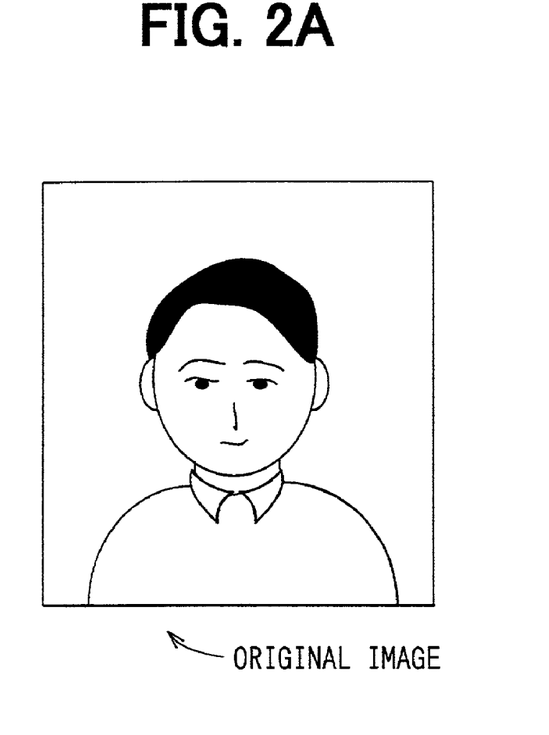
FIG. 2A is a pictorial diagram showing an example of an original image inputted to the image processing unit.
Figure 2B:
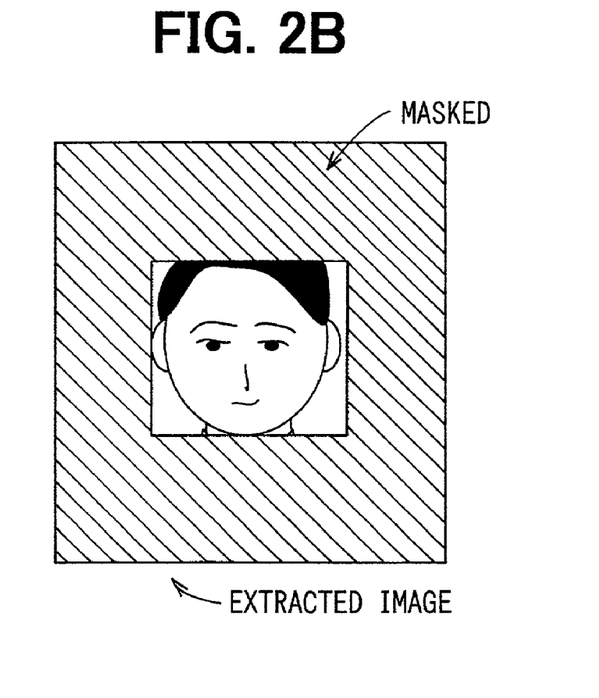
FIG. 2B is a pictorial diagram showing an example of an image extracted from the original image.

In the extract unit 20, the original image acquisition block 21 acquires, as an original image, a color image of a person shown in FIG. 2A by the second video camera 50. The data of the original image includes an 8-bit Red (R) value, an 8-bit Green (G) value and an 8-bit Blue (B) value for each pixel. The feature value calculation block 22 and the extract instruction block 23 together define, as an extractive area, a rectangular area including the person's face area in the original image. The image output block 24 extracts an image corresponding to the defined rectangular area from the original image, and outputs it to the monitor 60. Thus the extract unit 20 outputs an image in which portions other than the extracted area are masked as shown in FIG. 2B.

Specifically, the feature value calculation block 22 calculates a feature value for each pixel of the original image using a pixel evaluation model and the RGB values of the pixel. The extract instruction block 23 generates, based on the feature values, extract instruction data that designates the rectangular area to be extracted. The image output block 24 extracts and outputs the image of the designated rectangular area based on the extract instruction data.

The pixel evaluation model is generated by the modeling unit 10. The supervisory image acquisition block 11 acquires a supervisory image shown in FIG. 3A from memory unit 30, while the training image acquisition block 12 acquires a training image shown in FIG. 3B by the first video camera 40. The model generation block 13 generates the pixel evaluation model using the supervisory image and the training image.

Figure 3A:
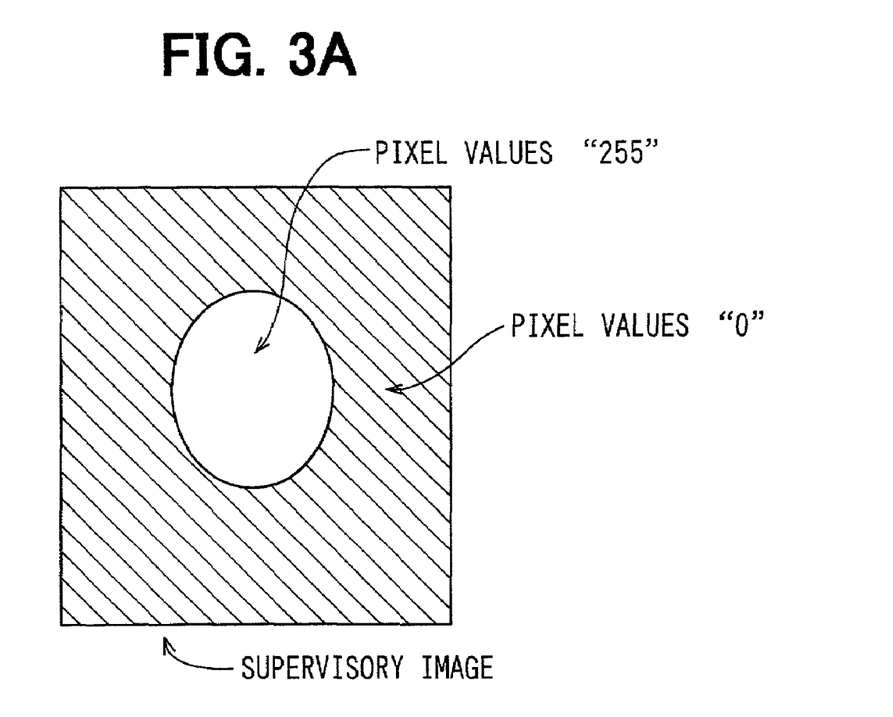
FIGS. 3A and 3B are pictorial diagrams showing examples of a supervisory image and the corresponding training image used for model generation.
Figure 3B:
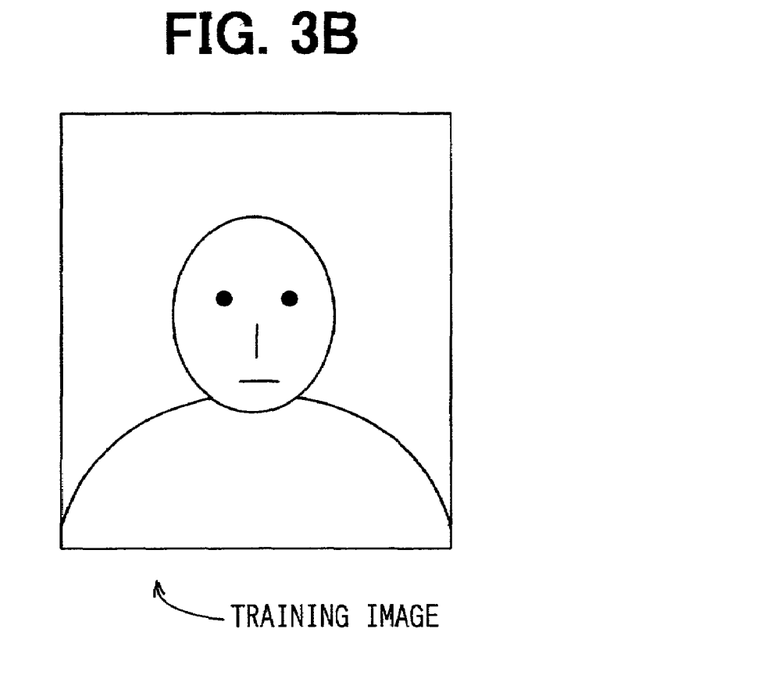

The training image is a color image of a person taken under the same condition under which the original image is taken. The training image should include an image of a person as shown in FIG. 3B. However, it may include an image of a doll instead of that of the person. In this case, the RGB values of pixels belonging to the face of the doll should be close to RGB values of pixels belonging to the face of the person.

On the other hand, the supervisory image is a monochrome image in which a portion corresponding to a characteristic portion (i.e., the face area) of the training image is white. However, the white portion of the supervisory image is not required to exactly correspond to the face area of the training image. The supervisory image includes the same number of pixels as the training image. The data of supervisory image includes an 8-bit value for each pixel. Specifically, in the supervisory image, the 8-bit value of each pixel belonging to the portion corresponding to the characteristic portion of the training image is set to "255", while the 8-bit value of each pixel belonging to the other portion is set to "0" as shown in FIG. 3A.

The model generation block 13 generates the pixel evaluation model according to a modification of Group Method of Data Handling (GMDH). The GMDH, which is modeled after a method for breeding seeds, is known as a method for modeling the relationship between input and output variables in a nonlinear system into a polynomial expression (See "Memoirs of Conference on Fuzzy Theory in Japan (vol. 17No. 2pp. 270–274, 1995)" or "system and control (vol. 23No. 12pp. 710–717, 1979)").

Figure 11:
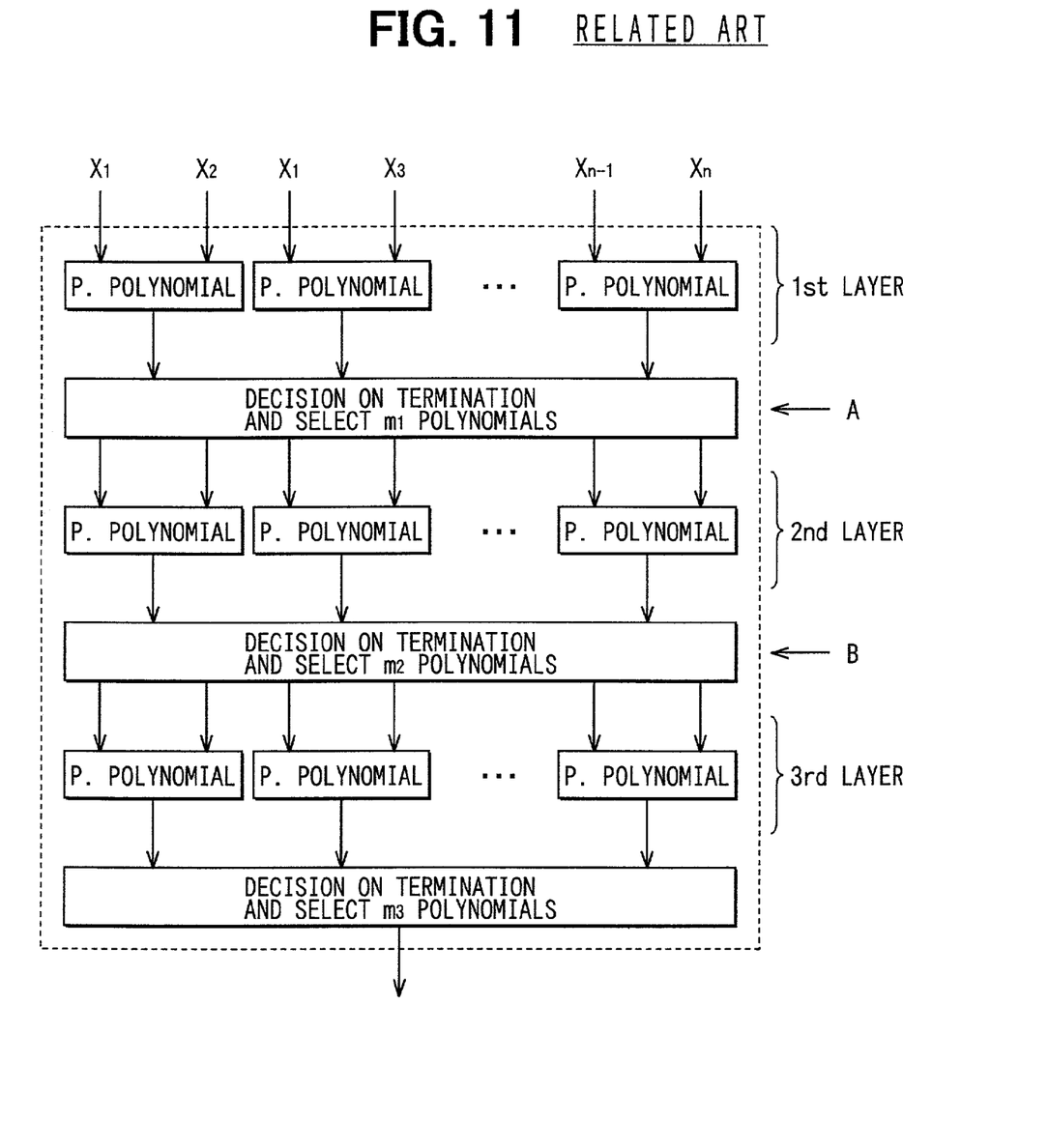
FIG. 11 is a schematic diagram showing how the GMDH generally generates an estimation model.

The GMDH generates layered quadratic polynomials each of which includes two variables on the right side as follows. Referring to FIG. 11, partial polynomials corresponding to the respective pairs of input variables $x_1 - x_n$ are first generated. That is, $_nC_2$ polynomials, where "n" represents the number of input variables $x_1 - x_n$, are generated as first-layer partial polynomials. The generated partial polynomials are trained using training data. Thereafter, at step A, the trained partial polynomials are evaluated using test data. Further it is determined at step A whether a predetermined criterion for termination of the model generation process is satisfied. If yes, the most superior partial polynomial is selected from the generated partial polynomials as an ultimate estimation model and thereafter the model generation process terminates. If not, $m_1$ partial polynomials ($m_1$ is a predetermined fixed number) are selected from the $_nC_2$ partial polynomials based on the result of the evaluation. The rest of the $_nC_2$ polynomials are discarded.

Next $_{m_1}C_2$ polynomials are generated as second-layer partial polynomials. Each of the generated partial polynomials includes output variables of two first-layer polynomials as input variables (i.e., on the right side). The generated partial polynomials are trained using the training data. Thereafter, at step B, the trained partial polynomials are evaluated using the test data, and it is determined whether the predetermined criterion for termination of the model generation process is satisfied. If yes, the most superior partial polynomial is selected from $m_1$ first-layer partial polynomials as the ultimate estimation model and thereafter the model generation process terminates. If not, $m_2$ partial polynomials ($m_2$ is a predetermined fixed number) are selected from the $_{m_1}C_2$ polynomials based on the result of the evaluation. The rest of the $_{m_1}C_2$ polynomials are discarded.

Thus the process is repeated for each layer. When the predetermined criterion for termination of the model generation process is satisfied, the most superior partial polynomial is selected from the partial polynomials of the previous layer as the ultimate estimation model. That is, the output of the selected partial polynomial is provided as the output of the ultimate estimation model. The partial polynomials of further previous layers involved in the selected partial polynomial are also selected as the partial polynomials included in the ultimate estimation model. Then the model generation process terminates. Thus the GMDH generates the estimation model for a non-linear system in the form of layered partial polynomials. According to the GMDH, computation is relatively complex especially when the number of the input variables is large.

Accordingly, the model generation block 13 generates the pixel evaluation model according to the modified GMDH, which generates the reduced number of polynomials. The modified GMDH generates only one partial polynomial for each layer, and the generated partial polynomial is employed only when the square error is reduced. The modified GMDH is effective especially in the case that the number of input variables is large (e.g., 13).

The model generation block 13 generates the pixel evaluation model based on the pixel-by-pixel relation between data of the training image and that of the supervisory image as follows in, for example, ten minutes. First it is assumed that the relationship f between the three input variables $x_1$, $x_2$, $x_3$ and the output y can be expressed as:

$$y = f(x_1, x_2, x_3) \qquad (1)$$

where the input variables $x_1$, $x_2$, $x_3$ correspond to the RGB values of a pixel of an image and the output y corresponds to the feature value that indicates whether the pixel belongs to the characteristic portion.

When input/output data corresponding to N pixels are given, some of the given data is used for training the model expressed as formula (1) and some of the given data is used for evaluating the trained model. For example, data corresponding to $N_t$ pixels are used for training, while data corresponding to $N_e (=N-N_t)$ pixels are used for evaluation. The given data may be divided into training data and test data (i.e., data for evaluation) regularly or randomly, or based on the variance of the given data. Further all given data corresponding to N pixels may be used for both training and evaluation.

In the present embodiment, the training image data of N pixels are given as input data, while the supervisory image data of N pixels are given as output data. Therefore these given data are appropriately divided into training data and test data as described above. That is, some pixels of the training image and supervisory image are used as the training data and some pixels of the training image and supervisory image are used as the test data.

Figure 4:
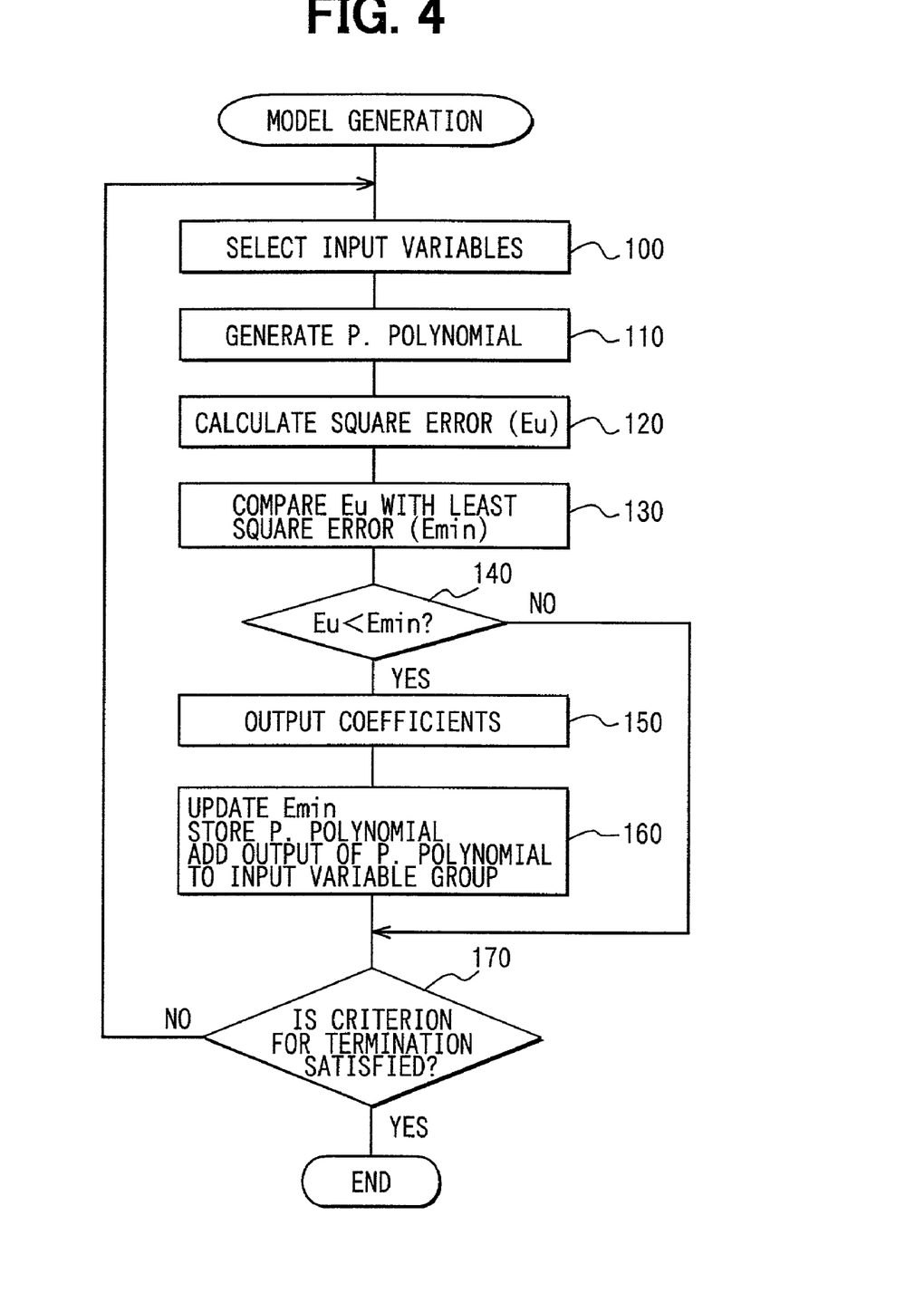
FIG. 4 is a flowchart of a model generation process executed by a modeling unit of the image processing unit.
Figure 5:
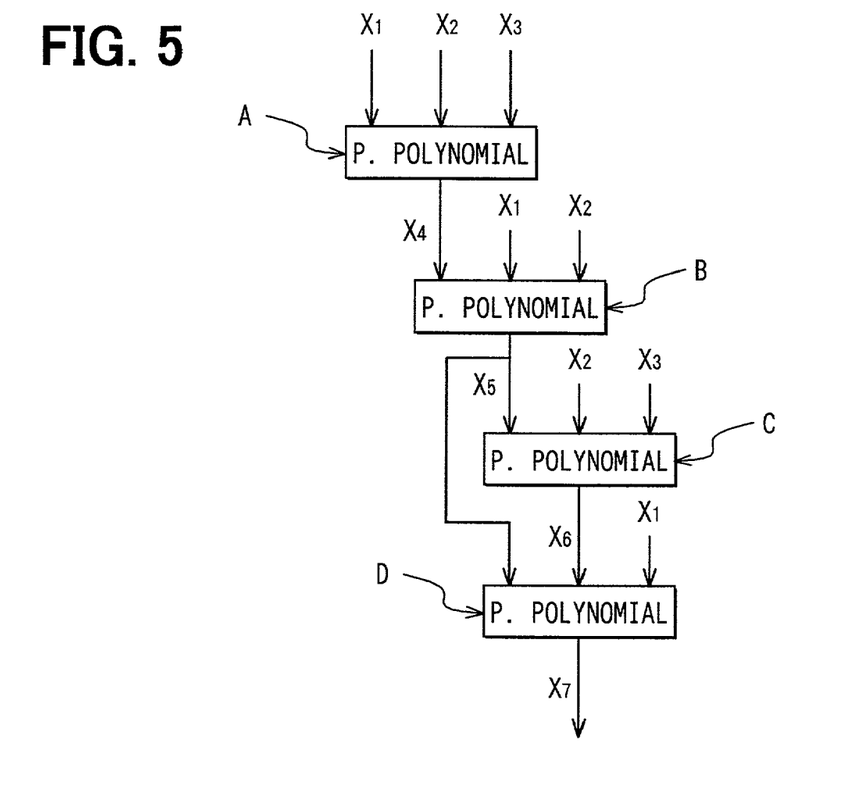
FIG. 5 is a schematic diagram showing how the model generation process generates a pixel evaluation model.

Referring to FIGS. 4 and 5, three different variables $x_p$, $x_q$, $x_r$ are randomly selected as input variables from an input variable group at step 100. When step 100 is first performed, the input variable group includes only three variables $x_1$, $x_2$, $x_3$ corresponding to the RGB values of the training image. Therefore the three variables $x_1$, $x_2$, $x_3$ corresponding to the RGB values are selected as the input variables $x_p$, $x_q$, $x_r$. Next a partial polynomial is generated using the input variables $x_p$, $x_q$, $x_r$ at step 110. The generated partial polynomial is expressed as:

$$z = c_0 + c_1 x_p + c_2 x_q + c_3 x_r + c_4 x_p^2 + c_5 x_q^2 + c_6 x_r^2 + c_7 x_p x_q + c_8 x_p x_r + c_9 x_q x_r \quad (2)$$

where $c_0$, $c_1$, ..., $c_9$ are coefficients. The variable z is referred to as an intermediate variable.

The coefficients $c_0$, $c_1$ ..., $c_9$ are determined using linear regression analysis so that a square error E is minimized. The square error E is expressed as:

$$E = \Sigma (y[i] - z[i])^2 \quad (3)$$

where z[i] is a value of z when the RGB values of the i-th pixel of the training image is substituted in formula (2), y[i] is the 8-bit value of the i-th pixel of the supervisory image, and the symbol "$\Sigma$" represents the summation for i =1, 2, ... $N_t$. The variable i represents each of the pixels which are selected as training data from the training image or the supervisory image. The 8-bit value of the i-th pixel of the supervisory image is thus used as a desired output of the pixel evaluation model when the RGB values of the i-th pixel of the training image are substituted in formula (2).

At step 120, the square error $E_u$ subject to evaluation, that is, the square error given by formula (3) after the coefficients $c_0$, $c_1$, ..., $c_9$ are fixed, is calculated using the test data. In this case the variable i represents each of the pixels which are selected as the test data from the training image or the supervisory image. At step 130, the square error $E_u$, is compared with a current least square error $E_{min}$ which is the minimum of the square errors $E_u$ of the partial polynomials which have been already generated. It is determined whether $E_u < E_{min}$ is satisfied at step 140. If yes (i.e., it is determined at step 140 that $E_u < E_{min}$ is satisfied), the process proceeds to step 150. If not (i.e., $E_u \geq E_{min}$ is satisfied), the process bypasses steps 150 and 160 so as to proceed to step 170. When decision step 140 is first executed, the process proceeds from step 140 to step 150 because the least square error $E_{min}$ is first set to a sufficiently large value.

At step 150, the coefficients $c_0$, $C_1$, ..., $c_9$ of the partial polynomial are outputted to the extract unit 20. Then the value of the least square error $E_{min}$ is replaced with the value of the square error $E_u$ at step 160. Thus the least square error $E_{min}$ is updated. Further the partial polynomial generated at step 110 is stored, and a new variable $x_{3+n}$ (n is a current repeat count) corresponding to the output z of the partial polynomial is added to the input variable group at step 160. Then the process proceeds to step 170.

At step 170, it is determined whether the current repeat count reaches a predetermined number (e.g., 20 or 30), that is, whether a criterion for termination of the process is satisfied. If yes (i.e., it is determined at step 170 that the current repeat count reaches the predetermined number), the process terminates. If not (i.e., it is determined at step 170 that the current repeat count does not reach the predetermined number yet), the process returns to step 100 to repeat steps 110–170. In this way, the pixel evaluation model corresponding to the relationship f of formula (1) is generated.

More specifically, the pixel evaluation model is generated as follows. Referring to FIG. 5, the variables $x_1$, $x_2$, $x_3$ corresponding to the RGB values of the training image are selected at step 100, and the partial polynomial A is generated using the variables $x_1$, $x_2$, $x_3$ at step 110. That is, the coefficients $c_0$, $c_1$, ..., $c_9$ of the partial polynomial are determined at step 110. Then the square error $E_u$ is calculated at step 120. Assuming that it is determined at steps 130 and 140 that $E_u < E_{min}$ is satisfied, the coefficients $c_0$, $c_1$, ..., $c_9$ are outputted to the extract unit 20 at step 150 and the least square error $E_{min}$ is updated using the square error $E_u$ at step 160. Further the partial polynomial A is stored and a variable $x_4$ corresponding to the output z of the partial polynomial A is added to the input variable group at step 160.

Then the process proceeds to step 170 and returns to step 100. Three different variables (e.g., $x_1$, $x_2$, $x_4$) are selected from the input variable group (i.e., input variables $x_1$–$x_4$) at step 100, and a partial polynomial B is generated using the selected variables $x_1$, $x_2$, $x_4$ at step 110. Assuming that it is determined at steps 130 and 140 that $E_u < E_{min}$ is satisfied, the coefficients $c_0$, $c_1$, ..., $C_9$ are outputted to the extract unit 20 at step 150. Further the least square error $E_{min}$ is updated, and the partial polynomial B is stored at step 160. Thus the process is repeated so that a partial polynomial is newly generated and the new partial polynomial is employed as one of partial polynomials that constitute the pixel evaluation model only when the square error $E_u$ corresponding to the new partial polynomial is less than the current least square error $E_{min}$ (i.e., the square error $E_u$ corresponding to the previously employed partial polynomial).

Assuming that two partial polynomials C, D are further employed as shown in FIG. 5 while execution of the process is repeated the predetermined number of times, the pixel evaluation model generated as a result of the repetitive execution of the process includes 4-layer partial polynomials A, B, C, D. The output $x_7$ of the fourth-layer partial polynomial D is provided as the output of the generated pixel evaluation model in this case.

Figure 6:
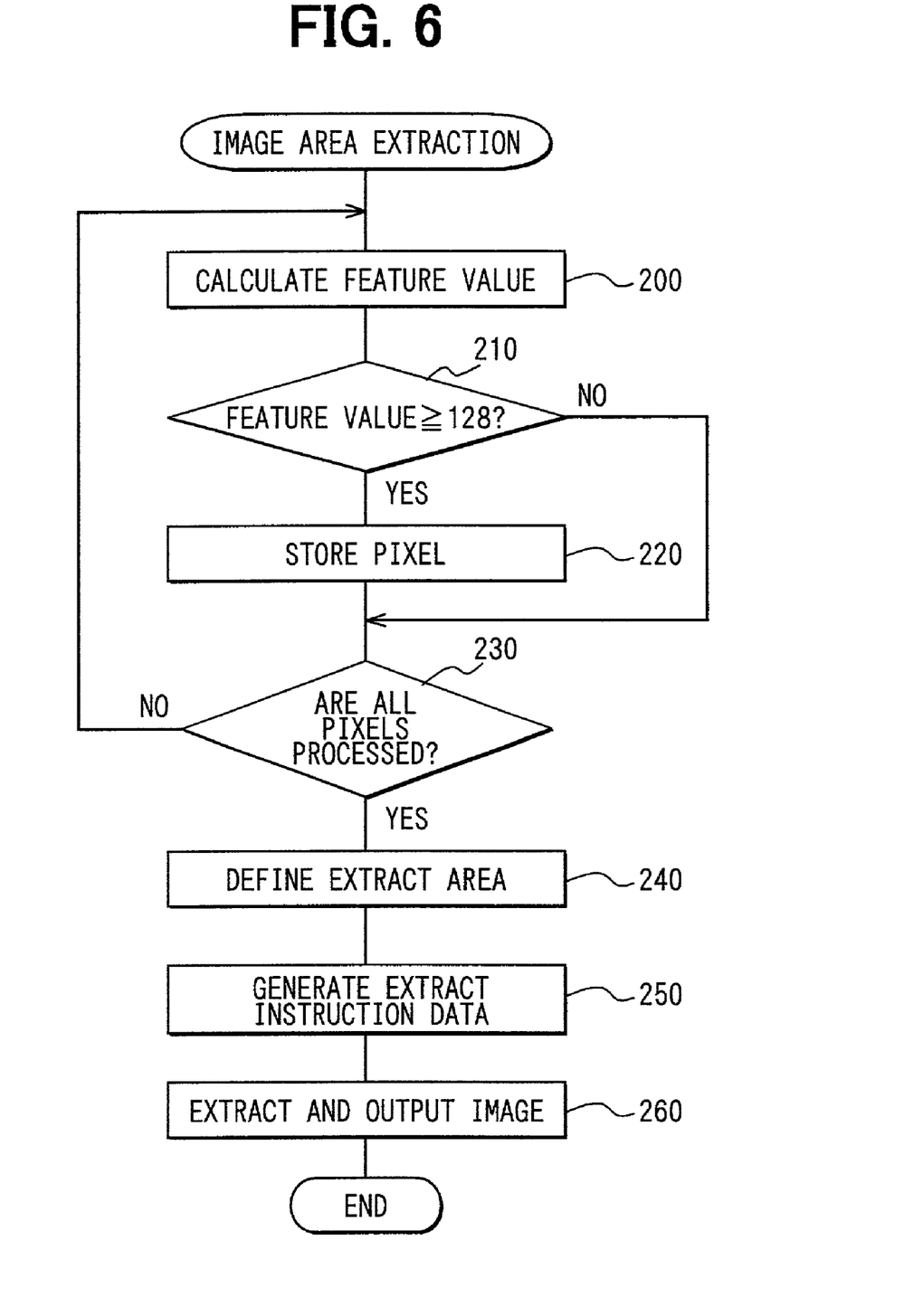
FIG. 6 is a flowchart of an image area extract process executed by an extract unit of the image processing unit.

The extract unit 20 receives the pixel evaluation model in the form of the coefficients $c_0$, $c_1$, ..., $c_9$ of the layered partial polynomials, which are outputted at step 150 of the model generation process. The extract unit 20 extracts the characteristic portion from the original image using the pixel evaluation model as follows. Referring to FIG. 6, at step 200, the feature value calculation block 22 calculates the feature value for one pixel of the original image by substituting the RGB values of the pixel in the pixel evaluation model.

It is determined whether the feature value is equal to or larger than 128 at step 210. If yes (i.e., it is determined at step 210 that the feature value is equal to or larger than 128), it is determined that the pixel belongs to the characteristic portion (i.e., face area) of the original image. Therefore the process proceeds to step 220 to store the pixel as a pixel belonging to the characteristic portion. If it is determined at step 210 that the feature value is less than 128, the process bypasses step 220 so as to proceed to step 230.

At step 230, it is determined whether steps 200–220 have been already performed for all the pixels of the original image. If yes (i.e., it is determined at step 230 that steps 200–220 have been already performed for all the pixels), the process proceeds to step 240. If not (i.e., it is determined at step 230 that steps 200–220 have not been performed for all the pixels), steps 200–220 are repeated for the next pixel. At step 240, the extract instruction block 23 defines, as an extractive area, a rectangular area so that the defined rectangular area includes all the pixels that have been stored at step 220. Then extract instruction data that designates the rectangular area is generated at step 250. The extract instruction data is binary data in which the values corresponding to the pixels belonging to the rectangular area are "1" and the values corresponding to the other pixels are "0".

The image output block 24 extracts an image of the rectangular area from the original image based on the extract instruction data, and outputs the extracted image at step 260. Then the process terminates. Since the extract instruction data is provided in the form of binary data, the image output block 24 or an external device which receives the extract instruction data can readily extract the designated portion. When the characteristic portion is thus extracted in the form of the rectangular area, the outline of the face area is properly recognized in the extracted image because the extracted image certainly includes the entire face area. In contrast, if an area that includes only pixels belonging to the face area is extracted, the extracted image does not necessarily include the entire face area, that is, the extracted face area may be notched.

The present image processing unit 1 may be implemented by a conventional computer system. However, it is preferable that the modeling unit 10 is implemented by a digital signal processor (DSP) dedicated to image processing so that the CPU which controls the extract unit 20 is not required to execute the processes of the modeling unit 10, because the model generation block 13 should perform complex calculation.

Further the blocks 11–13 of the modeling unit 10 and blocks 21–24 of the extract unit 20 may be implemented by programs executable on a computer. The programs may be stored in a computer readable medium such as FD, MO, CD-ROM, DVD, or a hard disk. In this case, the programs are loaded from the computer readable medium into a memory of the computer when they should be executed. Alternatively, the programs may be stored in computer readable medium such as ROM or backup RAM. In this case, the computer readable medium is incorporated in the computer system that implements the present image processing unit 1.

The effects of the present embodiment are as follows. The extract unit 20 extracts the characteristic portion from the original image using the pixel evaluation model which the modeling unit 10 generates using the training image taken under the same condition (shooting condition) under which the original image is taken. Therefore the present image processing unit 1 can adapt to change in the shooting condition. That is, it can extract the characteristic portion properly even if the shooting condition changes.

Further the modeling unit 10 of the present image processing unit 1 employs the modified GMDH as described above. The GMDH generates partial polynomials corresponding to the respective pairs of input variables for each layer. In contrast, the modified GMDH generates only one partial polynomial for each layer. Thus the computational complexity is alleviated, and therefore the modeling unit 10 can generate the pixel evaluation model more rapidly.

Moreover, according to the modified GMDH, the generated partial polynomial is employed only when the square error is reduced. It is observed that a partial polynomial, which includes as an input variable the output of a partial polynomial of the previous layer whose square error is relatively large (i.e., larger than the square error of the most superior partial polynomial of the previous layer), usually has a relatively large square error. Therefore the modified GMDH employs a new partial polynomial only when the square error is reduced. As a result, the computational complexity is reduced without decreasing the precision, and therefore the pixel evaluation model can be generated more efficiently.

Moreover in the present embodiment, when it is determined at step 140 that a new partial polynomial is employed, the coefficients $c_0, c_1, \ldots, c_9$ of the new partial polynomial is immediately outputted to the extract unit 20 at step 140. Therefore the present image processing unit 1 can output the image of the characteristic portion more rapidly, if some decrease in the precision is allowable. Further the present image processing unit 1 can output a less precise image of the characteristic portion as an interim output, and thereafter successively output more precise images.

Figure 7A:
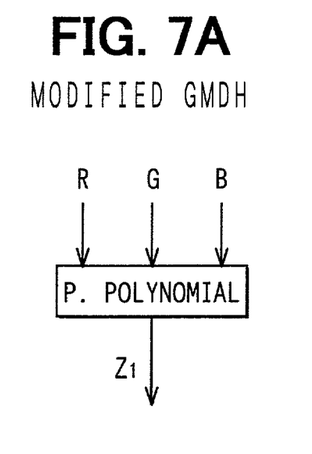
FIGS. 7A and 7B are schematic diagrams showing how partial polynomials are generated during the model generation according to a modified GMDH and a GMDH, respectively.
Figure 7B:
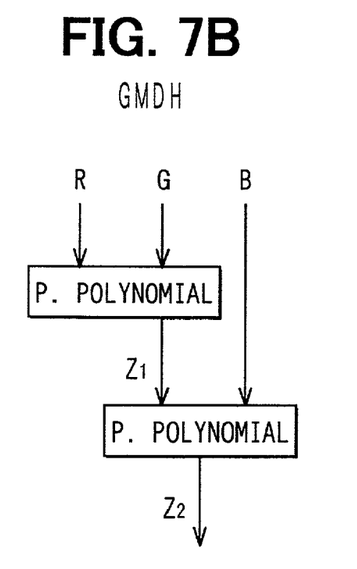

Further, according to the modified GMDH, one partial polynomial that includes three selected input variables is generated for each layer. Therefore, according to the modified GMDH, the pixel evaluation model which includes only one partial polynomial that includes three variables corresponding to RGB values may be generated as an interim output as shown in FIG. 7A. If the extract unit 20 extracts the characteristic portion using such a pixel evaluation model, the extracted image can be outputted in real time, for example, at a rate of 80 nano-seconds/pixel. In contrast, a pixel evaluation model generated according to the GMDH includes at least two partial polynomials as shown in FIG. 7B, because partial polynomials that include two input variables are generated for each layer according to the GMDH but the image data is in the form of three variables (i.e., the RGB values or YCrCb values).

Figure 8A:
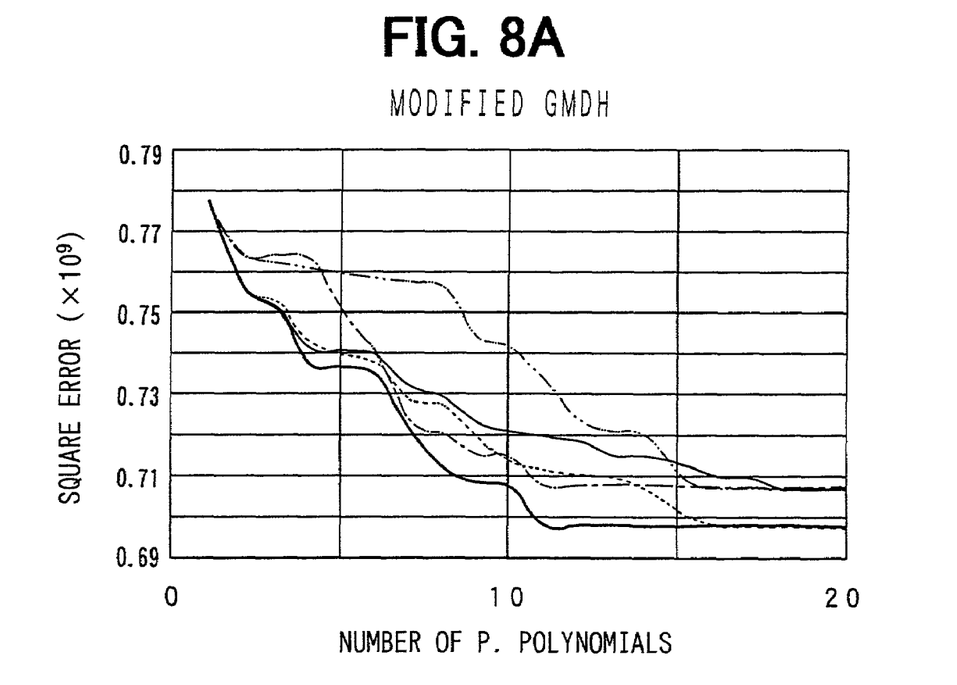
FIGS. 8A and 8B are graphs showing relationships between the number of partial polynomials generated during the model generation and the precision of the model according to the modified GMDH and the GMDH, respectively.
Figure 8B:
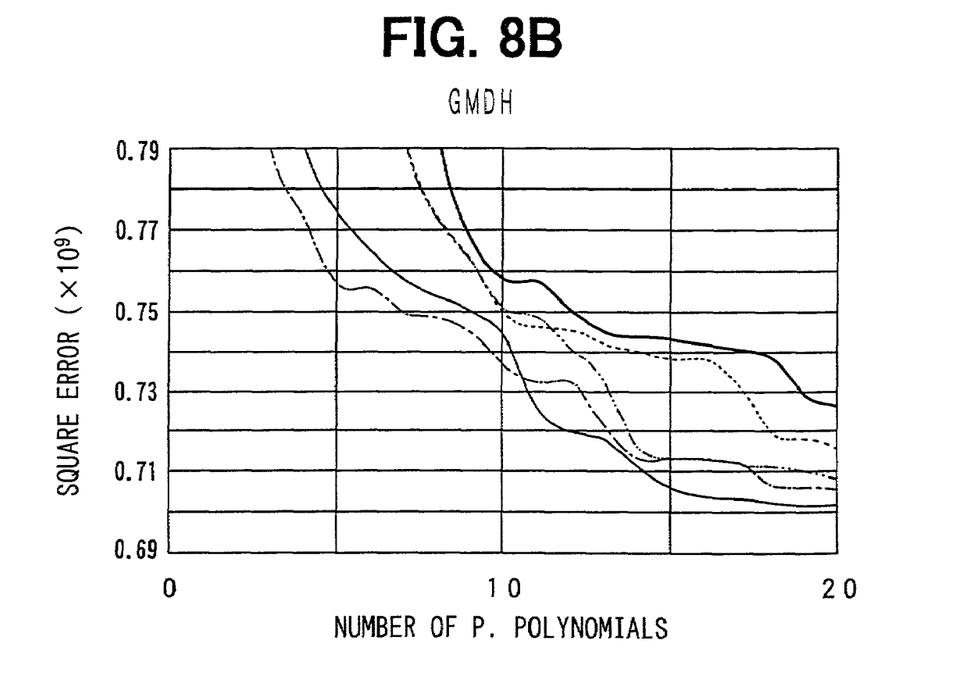

The model generation process was executed according to the modified GMDH five times as trials. FIG. 8A shows the relationship between the number of partial polynomials employed as a pixel evaluation model and the precision (i.e., the square error) of the pixel evaluation model, which were obtained as a result of the five trials. Further, the model generation process was also executed according to the GMDH five times as trials. FIG. 8B shows the relationship between the number of partial polynomials employed as a pixel evaluation model and the precision (i.e., the square error) of the pixel evaluation model, which were obtained as a result of the five trials. The same image data that includes N=307200 pixels were used for all the trials.

Figure 9:
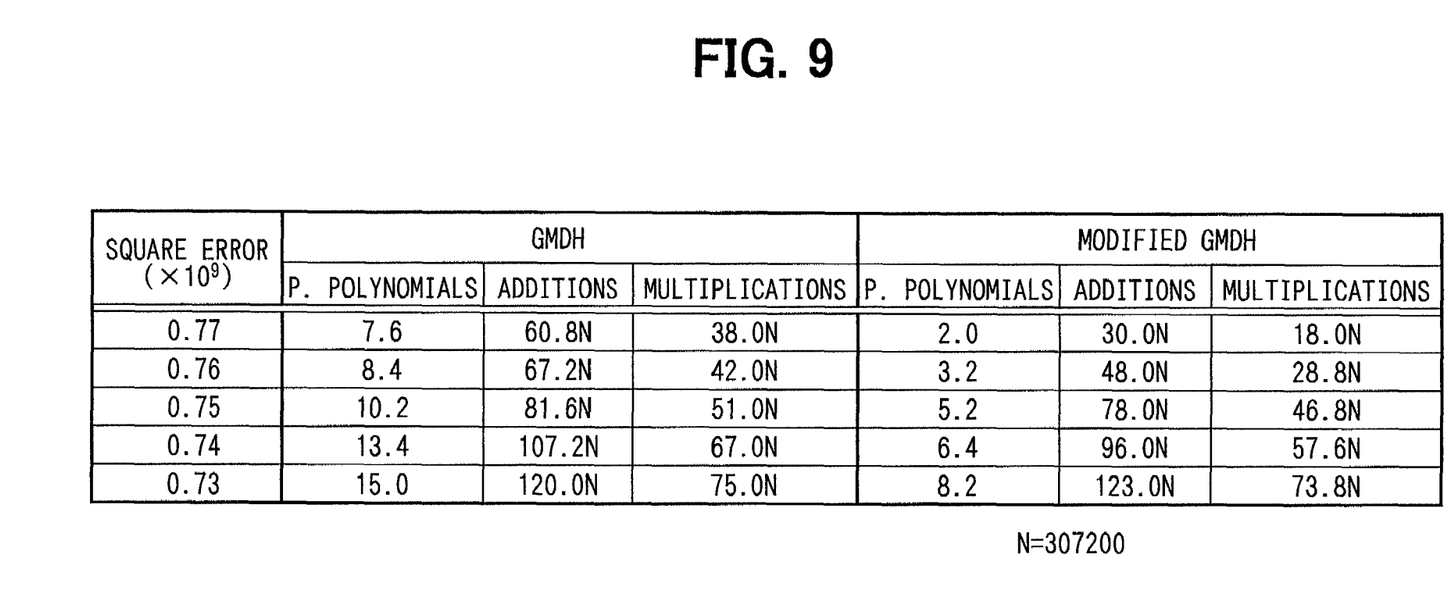
FIG. 9 is a table showing the number of the partial polynomials, the number of additions and multiplications required for achieving each of five discrete square errors according to the GMDH and the modified GMDH.

Further FIG. 9 shows the result of the same trials in the form of a table. The table includes the averages of the number of partial polynomials that should be employed as the pixel evaluation model, and the number of additions and multiplications that should be performed during the image area extract process using the pixel evaluation model for achieving each of five discrete square errors.

It is found that the modified GMDH can achieve the same precision by employing fewer partial polynomials as compared with the GMDH. For example, 10.2 partial polynomials are employed on average for achieving the square error of $0.75 \times 10^9$ or less according to the GMDH, while 5.2 partial polynomials are employed on average for achieving the same square error according to the modified GMDH. The reason is that each of the partial polynomials generated according to the modified GMDH holds a lot of information as compared with each of the partial polynomials generated according to the GMDH.

Further FIG. 9 shows that the pixel evaluation model generated according to the modified GMDH can achieve the same precision by performing less computation (i.e., by performing fewer additions and multiplications) as compared with the pixel evaluation model generated according to the GMDH. In the case that the model generated according to the modified GMDH is used for image area extraction, the computation that should be performed for calculating one partial polynomial is slightly more as compared with the case that the model generated according to the GMDH is used for image area extraction. However, the computation that should be performed for obtaining the output of the entire model is less because the number of partial polynomials included in the model is reduced.

In this way, according to the present embodiment, the pixel evaluation model that includes the reduced number of partial polynomials is generated rapidly, and consequently the responsiveness of the present image processing unit 1 is improved.

The supervisory image acquisition block 11 of the modeling unit 10 corresponds to supervisory image acquisition means of the present invention. The training image acquisition block 12 corresponds to training image acquisition means. The model generation block 13 corresponds to model generation means. The original image acquisition block 21 of the extract unit 20 corresponds to the original image acquisition means. The feature value calculation block 22 and the extract instruction block 23 together correspond to area definition means. The 8-bit value of the i-th pixel of the supervisory image corresponds to a supervisory output provided by the i-th pixel. The model generation process shown in FIG. 4 corresponds to a process executed by the model generation means. The processes executed at steps 200–250 of FIG. 6 correspond to processes executed by the area definition means.

MODIFICATIONS

In the above embodiment, it may be determined at step 130 whether the square error meets another criterion. The criterion 20 is, for example, that the square error is less than a predetermined reference value. In this case, the coefficients $c_0, c_1, \ldots, c_9$ are outputted at step 150 and further stored at step 160, only when the square error is less than the predetermined reference value. If the criterion is appropriately determined, both of a certain 25 degree of responsiveness and a certain degree of precision can be ensured.

Alternatively, the coefficients $c_0, c_1, \ldots, c_9$ may be outputted at step 150 as the final output, when the square error meets the predetermined criterion. In this case, the criterion for termination of the model generation process is also that the square error meets the predetermined criterion. Therefore, after the coefficients are first outputted at step 150, it is determined at step 170 that the criterion for termination is satisfied and therefore the model generation process terminates.

Further in the above embodiment, the training image acquisition block 12 and the original image acquisition block 21 may appropriately convert (e.g., filter) the training image and the original image respectively so that a characteristic portion is properly identified. Thereby the extract unit 20 can properly extract a characteristic portion.

In the above embodiment, decision step 170 for determining whether the criterion for termination of model generation process is satisfied may be performed based on the number of the partial polynomials that have been already employed, that is, the number of the validated partial polynomials.

In the above embodiment, the extract unit 20 may define, as an extractive area, an elliptical area that includes the face area instead of the rectangular area. Alternatively, the extract unit 20 may define, as an extractive area, an area that includes only the pixels belonging to the characteristic portion.

In the above embodiment, all the pixels of the training image and the supervisory image are not required to be used for calculating the square error E at steps 110 and 120, that is, for generating the pixel evaluation model. That is, some pixels which are sampled from the training image and the supervisory image may be used for calculating the square error E, because the characteristic portion of the image is relatively large in area. For example, one pixel may be selected from every four consecutive pixels for calculating the square error E, and the rest (i.e., the three pixels) may be discarded. In this case, the modeling unit 10 can generate the pixel evaluation model more rapidly, and therefore the responsiveness is further improved.

In the above embodiment, the training image and the original image are severally acquired using the respective cameras 40, 50. However, the image captured by the second camera 50 may be used as both of the original image and the training image. In this case, the first camera 40 is not required.

In the above embodiment, each pixel of the supervisory image is two-valued, that is, "0" or "255". However, each pixel of the supervisory image may be multi-valued.

In the above embodiment, the following partial polynomials may be generated instead of the partial polynomial (2).

$$Z = c_0 + c_1 x_p + c_2 x_q + c_3 x_r + c_4 x_p x_q + c_5 x_p x_r + c_6 x_q x_r \tag{4}$$

Further in the above embodiment, the modeling unit 10 may employ the GMDH as follows, because the number of the input variables of the pixel evaluation model to be generated (i.e., the number of variables provided as initial input variables when the pixel evaluation model is generated) is only three in this case. First, three polynomials corresponding to the respective pair $(x_1, x_2), (x_1, x_3), (x_2, x_3)$ of the input variables $x_1, x_2, x_3$ are generated as the first-layer partial polynomials. Each of the polynomials are expressed as:

$$z_k = c_0 + c_1 x_p + c_2 x_q + c_3 x_p^2 + c_4 x_q^2 + c_5 x_p x_q \tag{5}$$

where $c_0$–$c_5$ are coefficients and (k, p, q) is (1, 1, 2) (2, 1, 3) or (3, 2, 3). Alternatively the following partial polynomials may be generated instead of the partial polynomials (5).

$$z_k = c_0 + c_1 x_p + c_2 x_q + c_3 x_p x_q \tag{6}$$

The values of the coefficients are determined using a linear regression analysis so that the square error $E_k$ is minimized. The square error $E_k$ is expressed as:

$$E_k = \Sigma (y[i] - z_k[i])^2 \tag{7}$$

where $Z_k[i]$ is the value of z when the RGB values of the i-th pixel of the training image is substituted in formula (6), y[i] is the 8 bit value of the i-th pixel of the supervisory image, and the symbol "$\Sigma$" represents the summation for i. The variable i represents each of the pixels which are selected as training data from the training image or the supervisory image.

When the values of the coefficients $c_0$–$c_5$ are determined, the square error $E_k^u$ expressed as formula (7) is calculated using test data. In this case, the variable i represents each of the pixels which are selected as the test data from the training image or the supervisory image. If the least square error $E^1_{min}$ (i.e., the minimum of the square errors $E_k^u$) is larger than the default least square error $E^0_{min}$ (i.e., $E^1_{min} > E^0_{min}$ is satisfied), the partial polynomial corresponding to the least square error $E^1_{min}$ is selected as the pixel evaluation model and the model generation process terminates. If $E^1_{min} > E^0 min$ is not satisfied, $m_1$ partial polynomial(s) corresponding to smaller square error(s) $E_k^u$ are selected from the three partial polynomials $z_1$, $z_2$, $z_3$. The rest of the partial polynomials $z_1$, $z_2$, $z_3$ are discarded.

Next $m_1C_2$ polynomials expressed as formula (6) are generated as second-layer partial polynomials. Each of the generated partial polynomials includes output variables of two first-layer polynomials as input variables. The values of the coefficients $c_0$–$C_5$ are determined using training data, and then the square error $E_k^u$ expressed as formula (7) is calculated using test data. If the least square error $E^2$ min of the second layer is larger than the least square error $E^1_{min}$ of the first layer (i.e., $E^2_{min} > E^1_{min}$ is satisfied), the first-layer partial polynomial corresponding to the least square error $E^1 min$ is selected as the pixel evaluation model and the model generation process terminates. If $E^2_{min} > E^1_{min}$ is not satisfied, $m_2$ partial polynomials corresponding to smaller square errors $E_k^u$ are selected from the $m_1C_2$ polynomials. The rest of the $_{m1}C_2$ polynomials are discarded.

Thus the process is repeated for each layer (h-th layer). If $E^h_{min} > E^{h-1}_{min}$ is satisfied, the partial polynomial corresponding to the least square error $E^{h-1}_{min}$ of the previous layer ((h−1)th layer) is selected as the pixel evaluation model. Further partial polynomials of first-to (h−2)th layers involved in the selected (h−1)th-layer partial polynomial are selected as partial polynomials included in the pixel evaluation model. Then the model generation process terminates. That is, the model generation process terminates if the least square error is increased.

Figure 10:
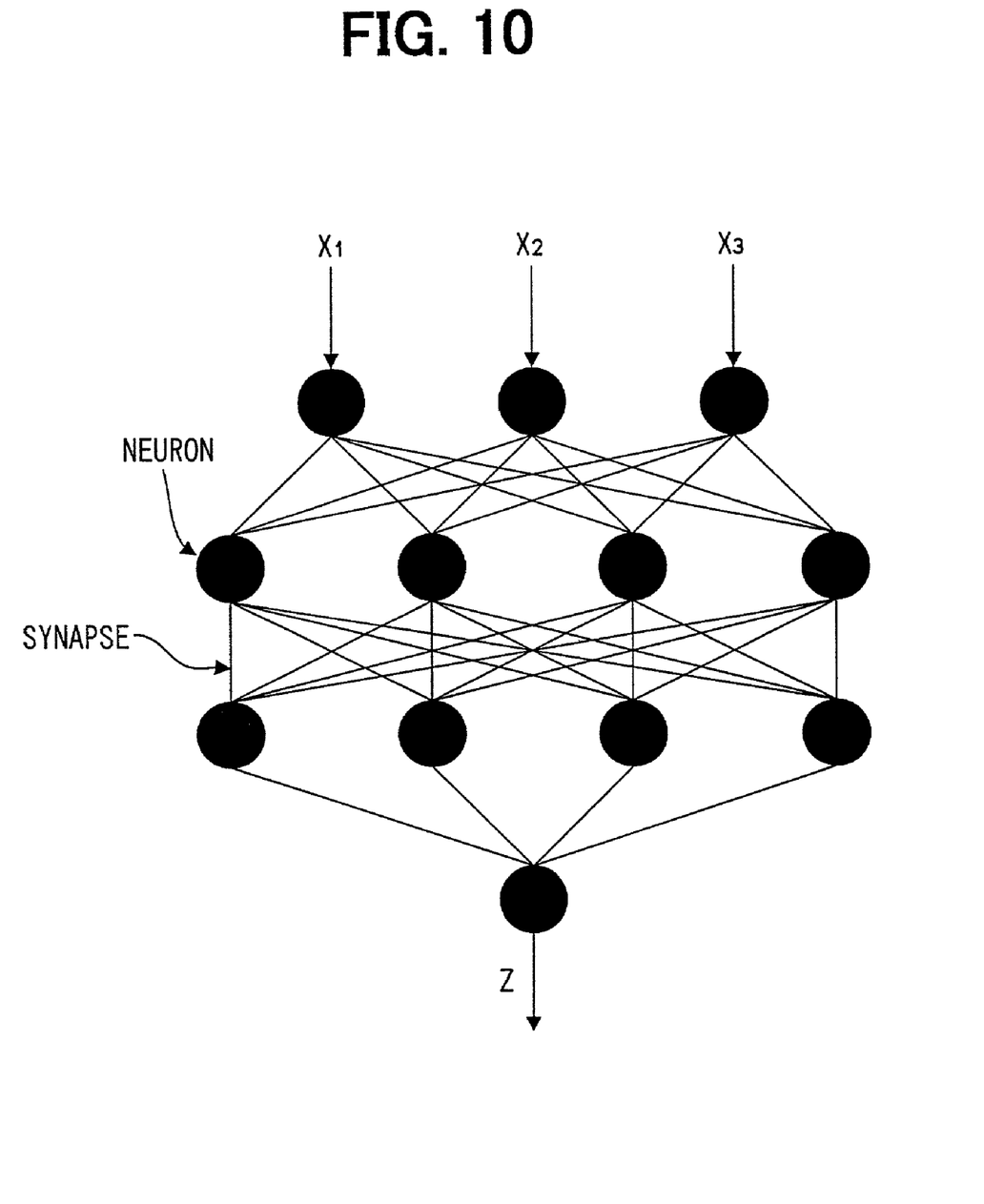
FIG. 10 is a schematic diagram showing a neural network employed for implementing the pixel evaluation model according to a modification of the embodiment.

In the above embodiment, the pixel evaluation model may be implemented by a neural-network program, which consists of neurons and synapses as shown in FIG. 10. However in this case, the responsiveness is lowered as compared with the above embodiment, because the neural network cannot be used as the complete pixel evaluation model until all the weights corresponding to the respective synapses are determined. That is, the modeling unit 10 cannot output a less precise model as an interim output.

In the above embodiment, the image processing unit 1 may extract, as a characteristic portion, an area other than the face area from the original image. In this case, the training image should include the characteristic portion, and the white portion of the supervisory image should correspond to the characteristic portion of the training image.

The present invention is not limited to the above embodiment and modifications, but may be variously embodied within the scope of the invention.

What is claimed is:

1. An image area extract unit for extracting a characteristic portion from an original image, comprising:
   original image acquisition means for acquiring said original image;
   training image acquisition means for acquiring a training image taken under a same condition under which said original image is taken;
   supervisory image acquisition means for acquiring a supervisory image that designates a characteristic portion of said training image, said supervisory image including pixels each of which provides a supervisory output, the characteristic portion of said training image corresponding to the characteristic portion of said original image;
   model generation means for generating a pixel evaluation model based on a relationship between a value of a first pixel of said training image and the supervisory output provided by a second pixel of said supervisory image, said second pixel corresponding to said first pixel, said pixel evaluation model receiving a value of one of pixels of said original image as an input and outputting a feature value of the pixel; and
   area definition means for calculating the feature value of each pixel of said original image by using said pixel evaluation model and defining an extractive area of said original image based on the feature value of each pixel of said original image, said extractive area including the characteristic portion of said original image.

2. An image area extract unit as in claim 1, wherein said area definition means determines whether each pixel of said original image belongs to the characteristic portion of said original image based on the feature value of the pixel, and defines said extractive area of said original image based on a result of the determination.

3. An image area extract unit as in claim 1, wherein said model generation means sequentially generates a plurality of partial polynomials according to a Group Method of Data Handling so that an estimation model that includes at least one of said plurality of partial polynomial is generated as said pixel evaluation model.

4. An image area extract unit as in claim 3, wherein, if an evaluation value of a first partial polynomial generated as one of said plurality of partial polynomials is improved as compared with an evaluation value of a second partial polynomial generated as one of said plurality of partial polynomials previous to said first partial polynomial, said model generation means employs said first partial polynomial as the polynomial included in said pixel evaluation model and an output of said first partial polynomial is provided as an output of said pixel evaluation model.

5. An image area extract unit as in claim 3, wherein, if an evaluation value of a partial polynomial generated as one of said plurality of partial polynomials satisfies a predetermined criterion, said model generation means employs said partial polynomial as the polynomial included in said pixel evaluation model and an output of said partial polynomial is provided as an output of said pixel evaluation model.

6. An image area extract unit as in claim 3, wherein each of said plurality of partial polynomials generated by said model generation means includes three variables selected from an input variable group that includes a variable corresponding to a value of a pixel of said training image.

7. An image area extract unit as in claim 6, wherein each of said plurality of partial polynomials generated by said model generation means is expressed as:

$$c_0 + c_1 x_p + c_2 x_q + c_3 x_r + c_4 x_p^2 + c_5 x_q^2 + c_6 x_r^2 + c_7 x_p x_q + c_8 x_p x_r + c_9 x_q x_r$$

where $x_p$, $x_q$, $x_r$ are said selected three variables and $c_0$, $c_1$, $c_2$, $c_3$, $c_4$, $c_5$, $c_6$, $c_7$, $c_8$, $c_9$ are coefficients.

8. An image area extract unit as in claim 6, wherein each of said plurality of partial polynomials generated by said model generation means is expressed as:

$$c_0 + c_1 x_p + c_2 x_q + c_3 x_r + c_4 x_p x_q + c_5 x_p x_r + c_6 x_q x_r$$

where $x_p$, $x_q$, $x_r$ are said selected three variables and $c_0$, $c_1$, $c_2$, $c_3$, $c_4$, $c_5$, $c_6$ are coefficients.

9. An image area extract unit as in claim 1,
wherein said original image acquisition means converts a first image taken under a condition into a second image in which a characteristic portion of said first image is identified, and provides said second image as said original image, and
wherein said training image acquisition means converts a third image, which is taken under the same condition under which said first image is taken, into a fourth image in which a characteristic portion of said third image is identified, and provides said fourth image as said training image.

10. An image area extract unit as in claim 1, wherein said first pixel is one of representative pixels that are selected from all pixels of said training image.

11. An image area extract unit as in claim 1, wherein said area definition means generates, as a result of definition, extract instruction data that designates pixels belonging to said extractive area of said original image.

12. A method for extracting a characteristic portion from an original image, said method comprising the steps of:
    acquiring said original image;
    acquiring a training image taken under a same condition under which said original image is taken;
    acquiring a supervisory image that includes pixels corresponding to pixels of said training image, said supervisory image designating a characteristic portion of said training image, the characteristic portion of said training image corresponding to the characteristic portion of said original image;
    generating a pixel evaluation model using said training image and said supervisory image, said pixel evaluation model receiving a value of one of pixels of said original image and outputting a feature value of the pixel;
    calculating the feature value of each pixel of said original image by using said pixel evaluation model; and
    defining an extractive area of said original image based on the feature value of each pixel of said original image, said extractive area including the characteristic portion of said original image.

13. A method as in claim 12, wherein said pixel evaluation model includes at least one partial polynomial.

14. A method as in claim 13, wherein said generating step comprises the steps of:
    (a) selecting a predetermined number of variables from an input variable group that includes a variable corresponding to a value of a pixel of said training image;
    (b) generating a first partial polynomial that includes said selected variables as input variables based on a relationship between a value of a first pixel of said training image and a value of a second pixel of said supervisory image, said second pixel corresponding to said first pixel;
    (c) calculating an evaluation value of said first partial polynomial based on a relationship between a value of a third pixel of said training image and a value of a fourth pixel of said supervisory image, said fourth pixel corresponding to said third pixel;
    (d) storing said first partial polynomial as the partial polynomial included in said pixel evaluation model and adding an output variable of said first partial polynomial to said input variable group, if said evaluation value of said first partial polynomial satisfies a predetermined criterion for employment of a partial polynomial; and
    (e) repeating the steps (a) to (d) if a predetermined criterion for termination of model generation is not satisfied.

15. A method as in claim 14, wherein the predetermined number of variables that is selected at said selecting step is 3.

16. A method as in claim 15, wherein said first partial polynomial generated at said generating step is expressed as:

$$c_0 + c_1 x_p + c_2 x_q + c_3 x_r + c_4 x_p^2 + c_5 x_q^2 + c_6 x_r^2 + c_7 x_p x_q + c_8 x_p x_r + c_9 x_q x_r$$

where $x_p$, $x_q$, $x_r$ are said selected three variables and $c_0$, $c_1$, $c_2$, $c_3$, $c_4$, $c_5$, $c_6$, $c_7$, $c_8$, $c_9$ are coefficients.

17. A method as in claim 15, wherein said first partial polynomial generated at said generating step is expressed as:

$$c_0 + c_1 x_p + c_2 x_q + c_3 x_r + c_4 x_p x_q + c_5 x_p x_r + c_6 x_q x_r$$

where $x_p$, $x_q$, $x_r$ are said selected three variables and $c_0$, $c_1$, $c_2$, $c_3$, $c_4$, $c_5$, $c_6$ are coefficients.

18. A method as in claim 14, wherein said predetermined criterion for employment of a partial polynomial is that said evaluation value of said first partial polynomial is improved as compared with an evaluation value of a second partial polynomial that is generated at said generating step previous to said first partial polynomial.

19. A computer readable medium with a computer program code for extracting a characteristic portion from an original image, said computer program code comprising:
    program code for acquiring said original image;
    program code for acquiring a training image taken under a same condition under which said original image is taken;
    program code for acquiring a supervisory image that includes pixels corresponding to pixels of said training image, said supervisory image designating a characteristic portion of said training image, the characteristic portion of said training image corresponding to the characteristic portion of said original image;
    program code for generating a pixel evaluation model based on a relationship between a value of a first pixel of said training image and a value of a second pixel of said supervisory image, said second pixel corresponding to said first pixel, said pixel evaluation model receiving a value of one of pixels of said original image and outputting a feature value of the pixel;
    program code for calculating the feature value of each pixel of said original image by using said pixel evaluation model; and
    program code for defining an extractive area of said original image based on the feature value of each pixel of said original image, said extractive area including the characteristic portion of said original image.

20. A computer readable medium which stores a computer program code for extracting a characteristic portion from an original image, said computer program code comprising:
    program code for acquiring said original image;
    program code for acquiring a training image taken under a same condition under which said original image is taken;
    program code for acquiring a supervisory image that designates a characteristic portion of said training image, said supervisory image including pixels each of which provides a supervisory output, the characteristic portion of said training image corresponding to the characteristic portion of said original image;

program code for generating a pixel evaluation model based on a relationship between a value of a first pixel of said training image and the supervisory output provided by a second pixel of said supervisory image, said second pixel corresponding to said first pixel, said pixel evaluation model receiving a value of one of pixels of said original image and outputting a feature value of the pixel;

program code for calculating the feature value of each pixel of said original image by using said pixel evaluation model; and program code for defining an extractive area of said original image based on the feature value of each pixel of said original image, said extractive area including the characteristic portion of said original image.

* * * * *